United States Patent
Virji et al.

(10) Patent No.: US 7,590,541 B2
(45) Date of Patent: Sep. 15, 2009

(54) HMI PRESENTATION LAYER CONFIGURATION SYSTEM

(75) Inventors: Shafin A. Virji, Vancouver (CA); Clifton H. Bromley, New Westminister (CA); Eric G. Dorgelo, Port Moody (CA); Kevin G. Gordon, Annacis Island Delta (CA); Douglas J. Reichard, Fairview, OH (US); Marc D. Semkow, Burnaby (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 522 days.

(21) Appl. No.: 11/240,131

(22) Filed: Sep. 30, 2005

(65) Prior Publication Data

US 2007/0078658 A1   Apr. 5, 2007

(51) Int. Cl.
*G10L 11/00* (2006.01)
*G10L 15/26* (2006.01)
*G10L 21/00* (2006.01)
*G06F 3/16* (2006.01)
*G05B 11/01* (2006.01)

(52) U.S. Cl. .............. 704/270; 704/235; 704/275; 715/727; 700/17

(58) Field of Classification Search ............... None
See application file for complete search history.

(56) References Cited

U.S. PATENT DOCUMENTS

| | | | |
|---|---|---|---|
| 5,724,506 A | 3/1998 | Cleron et al. | |
| 5,737,591 A | 4/1998 | Kaplan et al. | |
| 5,802,515 A | 9/1998 | Adar et al. | |
| 6,081,782 A | 6/2000 | Rabin | |
| 6,108,662 A * | 8/2000 | Hoskins et al. | 707/102 |
| 6,192,357 B1 | 2/2001 | Krychniak | |
| 6,295,391 B1 | 9/2001 | Rudd et al. | |
| 6,539,271 B2 | 3/2003 | Lech et al. | |
| 6,636,590 B1 | 10/2003 | Jacob et al. | |
| 6,834,209 B2 | 12/2004 | Potz et al. | |
| 6,839,670 B1 | 1/2005 | Stammler et al. | |
| 6,904,387 B2 | 6/2005 | Melzer | |
| 6,943,665 B2 | 9/2005 | Chornenky | |
| 7,249,023 B2 * | 7/2007 | Pyle et al. | 704/270 |
| 2003/0110040 A1 * | 6/2003 | Holland et al. | 704/275 |
| 2004/0260538 A1 * | 12/2004 | Morse | 704/201 |
| 2005/0107897 A1 * | 5/2005 | Callaghan | 700/87 |
| 2006/0010246 A1 | 1/2006 | Schulz et al. | |
| 2006/0101346 A1 * | 5/2006 | Denzlein | 715/762 |
| 2006/0277498 A1 * | 12/2006 | Mann et al. | 715/825 |
| 2006/0277499 A1 * | 12/2006 | Britt et al. | 715/828 |

* cited by examiner

*Primary Examiner*—David R Hudspeth
*Assistant Examiner*—Brian L Albertalli
(74) *Attorney, Agent, or Firm*—Turocy & Watson LLP; Alexander R. Kuszewski

(57) ABSTRACT

A human-machine interface generation system comprises a voice recognition component that receives voice commands relating to generation of a human-machine interface within an industrial automation environment. The voice recognition component further translates the voice commands into machine code, such as into a query that conforms to a database query language. A view generation component communicatively coupled to the voice recognition component generates a human-machine interface based at least in part upon the received voice commands. For example, the view generation component can access a data store that includes graphical depictions of portions of a plant relating to the received voice commands.

27 Claims, 11 Drawing Sheets

HMI PRESENTATION LAYER CONFIGURATION SYSTEM

TECHNICAL FIELD

The subject invention relates to industrial control systems and, more particularly, to human-machine interfaces (HMIs).

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface. These graphical user interfaces improve an ability of users to access information quickly and easily.

Generation of these HMIs, however, has remained extremely problematic. For instance, an original equipment manufacturer (OEM) today is forced to utilize a pointing and clicking mechanism, a keyboard, and his/her imagination to generate HMI displays for a particular device and/or process. This task is often laborious, time-consuming, error prone and frustrating to a designer of one of such interfaces. In more detail, a designer of an HMI can spend months designing HMI for a plant due to specific needs of such plant. This process can cause designer angst, as numerous steps are required to build an HMI and perform what seem to be simple operations. Currently, hot keys, tool bars, menu options, and various validation techniques are employed to aid in design and implementation of HMIs.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Systems, methods, apparatuses, and articles of manufacture that facilitate generation of human-machine interfaces (HMIs) by way of voice commands are described herein. In more detail, a designer or operator wishing to build an HMI, rather than laboriously traversing menus by way of keyboard, mouse, and the like, can simply utilize voice commands to render design of HMIs more efficiently. For example, an operator can make simple statements regarding a system, device, process, and/or sub-process for which an HMI is desirably generated. These voice commands can be received, for instance, through utilization of a microphone or any other device that facilitates voice reception. The voice commands can be analyzed and translated into a format that facilitates retrieval of HMI-related data from a database. For instance, the voice commands can be translated into a query that conforms to a database query language. The database can include a sufficient amount of information to generate a robust and useful HMI. In one particular example, the database can include device-related data, such as type of device, capabilities of a device, associations of a device, users associated with the device, user authorization levels relating to the device, physical location of the device, etc. Moreover, the database can include data relating to processes, sub-processes, systems, and the like.

While initial voice commands can be useful in generating an HMI, often such initial commands may be associated with insufficient information and/or specificity to enable creation of a suitable HMI. Accordingly, a dialog can be created if more information is needed to generate the HMI. For instance, a designer can provide a first voice command and a database can be accessed based upon such command. It can then be determined that there is insufficient data associated with the command to create the HMI. Questions can be provided to the designer to extract more information from such designer relating to the HMI. In a detailed example, the designer can state "generate an HMI for a pump." A dialog can be created asking the designer which type of pump, where the pump is located, etc., thereby enabling extraction of data from the database that relates precisely to the designer's wishes.

Furthermore, data utilized in connection with one or more features described herein can conform to a hierarchically structured data model that can be permeated throughout a factory. In one particular example, the data model can be based at least in part upon ISA S88, ISA S95, OMAC, and/or any combination thereof. This data model enables efficient updating of the above-referenced database through plug-and-play techniques. In more detail, an industrial automation network can be monitored to determine when/if a device has been added/removed from the network. Parameters from such device can then be received through interrogating the device and/or any other suitable means. In still yet another example, a tool-tip functionality can be included. For instance, an operator can specify portions of an HMI that will be associated with tool-tips, wherein the tool-tips are activated through voice commands and/or by hovering over a particular portion of the HMI.

To the accomplishment of the foregoing and related ends, certain illustrative aspects are described herein in connection with the following description and the annexed drawings. These aspects are indicative, however, of but a few of the various ways in which the principles of the claimed subject matter can be employed, and such matter is intended to include all such aspects and their equivalents. Other advantages and novel features will become apparent from the following detailed description when considered in conjunction with the drawings.

DETAILED DESCRIPTION

Figure 1:
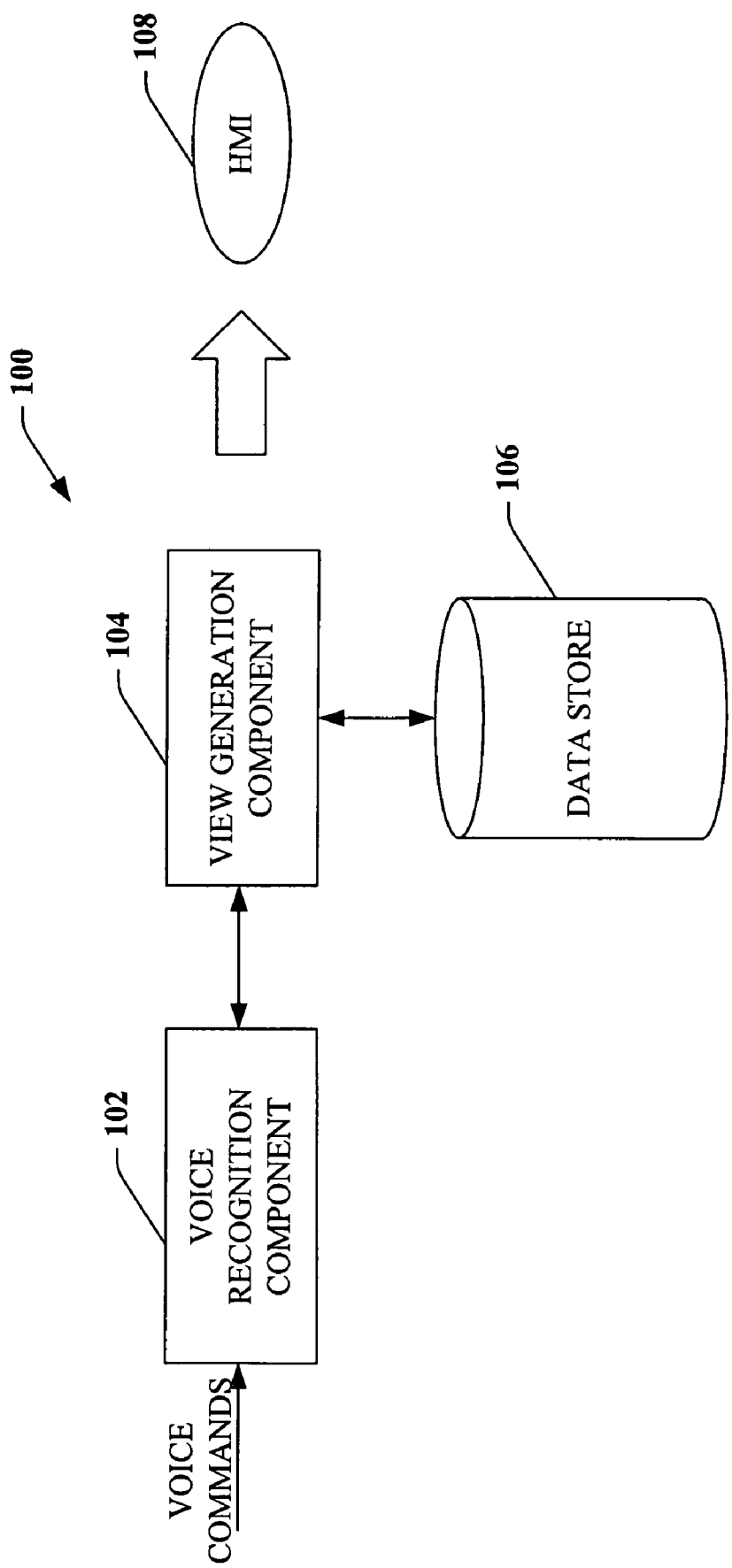
FIG. 1 is a high-level system block diagram of a system that facilitates generation of a human-machine interface by way of voice commands.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates generation of a human-machine interface (HMI). The system 100 includes a voice recognition component 102 that receives voice commands relating to a desirably generated HMI. The voice commands can be solicited by the system 100 through text, graphics, or an audible output. For instance, an operator can be provided with audible questions, such as "would you like to generate an HMI?" Similarly, solicitations can be provided to an operator in text, graphics, and the like. The voice commands received by the voice recognition component 102 can also be unsolicited, wherein an operator simply provides voice commands to the voice recognition component 102 informing such component 102 that an HMI is desirably generated. In still further detail, the voice commands can indicate a system, device, process, and/or sub-process with respect to which an HMI is desirably modified or created. In a particular example, an operator can state "generate an HMI for pump 3 on line 2 within work cell 4." It is understood, however, that any suitable voice commands can be employed in connection with indicating which system, device, process, and/or sub-process for which an HMI is desirably created.

The voice recognition component 102 can, upon receipt of the voice commands, translate such commands into digitized data that can be received and contemplated by a processor.

For instance, the voice commands can be translated into a query in a particular language. In another example, the voice recognition component 102 can translate the voice commands into text, which can thereafter be converted into a query or other suitable command that can be executed by a processor. The system 100 further includes a view generation component 104 that receives commands and/or queries that are generated from the voice commands received by the voice recognition component 102. The view generation component 104 can access a data store 106 and locate text, graphics, images, video, and the like that are associated with the voice commands. Continuing with the above example relating to the pump, the view generation component 104 can access the data store 106 and determine parameters relating to the pump. For instance, number of inputs/outputs associated with the pump, devices associated with the pump, type of pump, and any other suitable data can be included within the data store 106. Based at least in part upon such parameters, the view generation component 104 can create an HMI 108. Thus, voice commands can be utilized to create the HMI.

Voice commands received by the voice recognition component and implemented by the view generation component 104 can also relate to style of the HMI (and not solely content). For instance, the voice commands can relate to size or position of a graphical object, color of particular depictions within the HMI 108, text displayed on the HMI, and the like. For instance, an operator creating the HMI can see that the HMI 108 includes a graphical depiction of a particular color in a certain location. The operator can state "move picture left one inch", and the graphical depiction can be relocated accordingly. Similarly, the operator can state "change color of pushbutton one to blue" and the color of such pushbutton can be altered. In still yet another example, the system 100 can be utilized to restrict access to a generated HMI. For instance, the voice commands can indicate that a select group of individuals should be able to access and utilize the HMI 108. In a more detailed example, the operator can state "restrict use of HMI to maintenance personnel." This statement can be recognized by the voice recognition component 102 and a translated version thereof can be delivered to the view generation component 104. The view generation component can then create the HMI 108 so that access is restricted to the specified personnel. While the above examples describe creation of an HMI de novo, it is understood that the system 100 can be employed to modify and/or update an existent HMI.

Figure 2:
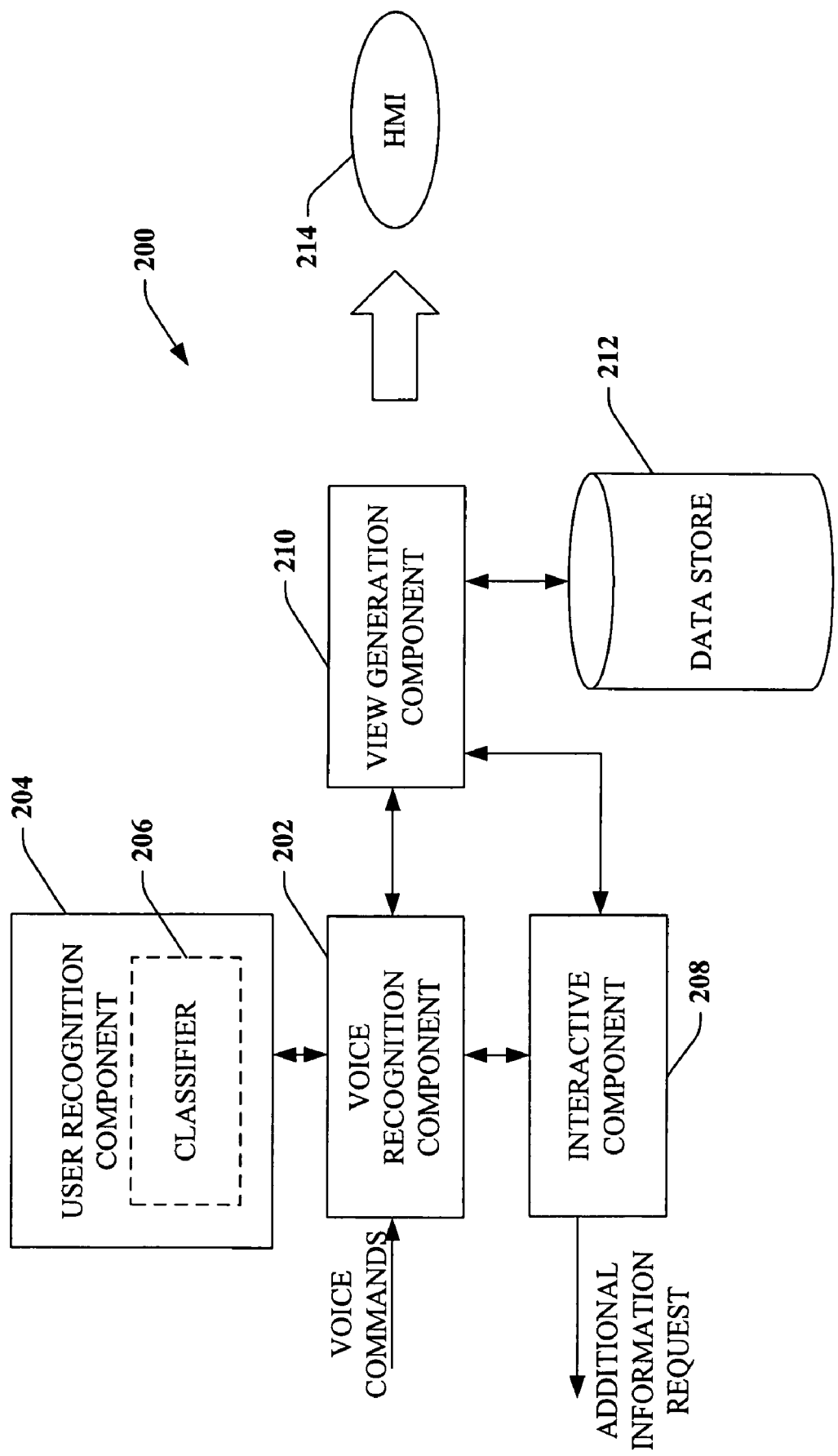
FIG. 2 is a system block diagram of a system that facilitates creation of a dialog in connection with creating a human-machine interface.

Now referring to FIG. 2, a system 200 that facilitates generation of HMIs through voice commands is illustrated. The system 200 includes a voice recognition component 202 that receives voice commands relating to generation of an HMI. As described above, the voice commands can relate to one or more of a system, device, process, and/or sub-process that is desirably controlled. For instance, an operator desiring to build an HMI can provide voice commands such as "I would like to control a pump." The voice recognition component 202 can be associated with a user recognition component 204 that recognizes a user based upon dialect and/or choice of words. For instance, the user recognition component 204 can include a classifier 206 that can perform classification on received voice input to determine an initiator of the voice commands. A classifier is a function that maps an input attribute vector, $x=(x1, x2, x3, x4, xn)$, to a confidence that the input belongs to a class, that is, $f(x)=$confidence (class). Such classification can employ a probabilistic and/or statistical based analysis (e.g. factoring into the analysis utilities and costs) to prognose or infer an action that a user or process desires to be automatically performed. A support vector machine (SVM) is an example of a classifier that can be employed. The SVM operates by finding a hypersurface in the space of possible inputs wherein the hypersurface attempts to split the triggering criteria from a non-triggering event. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As described above, the classifier 206 can be employed to determine user identity, and such determination can be utilized for security purposes (e.g., to determine whether the user is authorized to generate an HMI by way of the system 200) as well as to aid in recognizing the voice commands. For instance, a first user of the system 200 can be from Australia and be associated with a dialect that is dissimilar from a second user who is from New York City. Upon determining user identity, various classifiers (not shown) can be selected to facilitate comprehending voice commands provided by an operator. For example, a first classifier or set of classifiers can be associated with a first user while a second classifier or set of classifiers can be associated with a second user.

The system 200 further includes an interactive component 208 that effectuates extracting additional information from a provider of the voice commands. For instance, the interactive component 206 can output text to a graphical screen and/or output audio signals indicating that additional information is required. Thus, the interactive component 208 can be utilized to effectuate a dialog between a provider of the voice commands and the system 200. In one particular example, an operator can state "create HMI for a pump." The interactive component 208 can then request additional, more specific information from the operator, such as "what type of pump," "what is the location of the pump," or any other suitable inquiries or requests for additional information. In another example, the interactive component 208 can be communicatively associated with a view generation component 210 that accesses a data store 212, wherein the data store 212 includes information that can be utilized to create an HMI 214. For example, the data store 212 can include data indicative of associations between devices, device capabilities, device parameters, process parameters, graphical depictions of devices, processes, and the like, video, and any other suitable data that may be necessary to create the HMI 214. The associations and other data within the data store 212 can be generated automatically through plug-and-play techniques, device interrogation, or any other suitable means. In another example, the data within the data store 212 can be entered manually by one or more operators.

In one exemplary use of the system 200, an operator can provide voice commands to the voice recognition component 202 relating to creation of an HMI for a conveyor. The user recognition component 204 can analyze the voice commands (through utilization of the classifier 206) and determine an identity of the provider of the voice commands. This identification can then be used to better comprehend voice commands provided to the voice recognition component 202. Voice commands can then be translated to a query language or other suitable language that can be processed by a processor. The view generation component 210 can access the data store 212 to determine if the HMI 214 can be generated based upon the received commands. If the information is insufficient or too vague (which can be determined upon analyzing content of the data store 212), the view generation component can inform the interactive component 208, and such component 208 can request additional information from the provider of the voice commands. Using the system 200, use of a mouse, keyboard, menus, and other conventional devices will not be necessary to generate the HMI 214.

In another example, a designer of an HMI can provide information to the voice recognition component 202 relating to which users are authorized to utilize a created/modified HMI as well as access privileges associated with the HMI. In other words, the designer can enter names, responsibilities and security access information for all operators into the HMI /screen they are creating. Then the designer can specify who has access to perform what actions once the HMI system is put in operation. Accordingly, the HMI 214 generated through utilization of the system 200 can automatically determine, based on device, who has access to the device and actions that can be undertaken with respect to the device. In a specific example, a designer can provide a command such as "create a display to control a pump at location Y" to the voice recognition component 202 and passed to the view generation component 210. The data store 212 can then be accessed by the view generation component 210 to gather information not just about the pump but also about identities of operators in the plant, which operators are allowed to perform operations with respect to the pump, and which actions are authorized for each operator. These security settings can automatically be applied to the objects on the HMI graphical display without the designer having to specify such settings manually.

Figure 3:
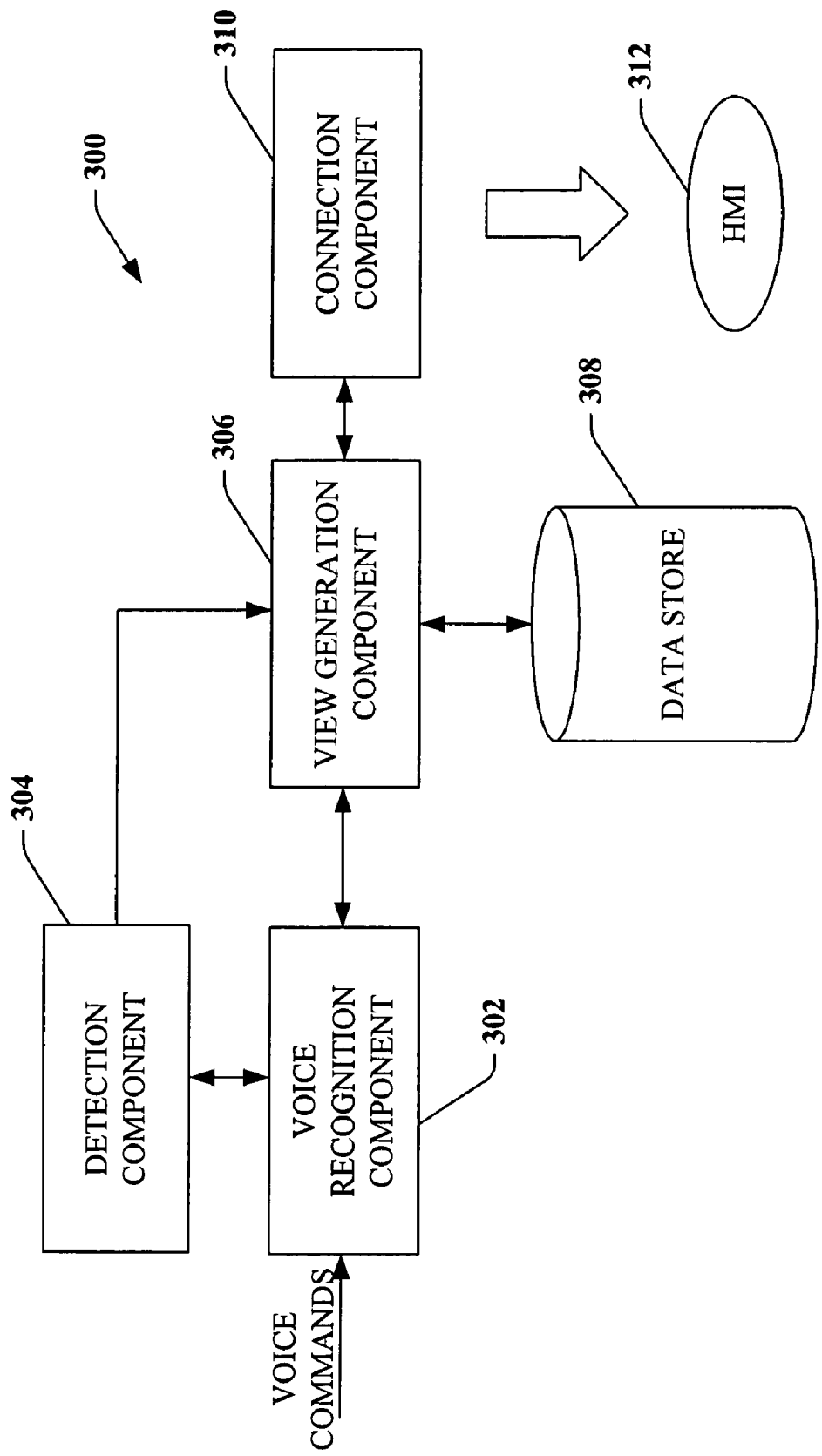
FIG. 3 is a system that facilitates generating communications connections to be utilized for controlling a device/process.

Now referring to FIG. 3, a system 300 that facilitates generation of HMIs through voice commands is illustrated. The system 300 includes a voice recognition component 302 that receives voice commands relating to an HMI that is desirable created. A detection component 304 is employed to detect when synonyms are utilized. For instance, the detection component 304 can include a table of terms that are synonyms for terms recognized by the voice recognition component 302. In one particular example, an individual from the United States may use the term "elevator" while an individual from England may employ the term "lift." Moreover, the detection component 304 can analyze content of voice commands to aid in determining meaning of a word or phrase within the voice commands. For instance, surrounding words or phrases can be indicative of meaning of a word or phrase at issue. The detection component 304 can thus make inferences to intended meaning of a word or phrase based upon other words or phrases provided by an operator/user. As used herein, the term "infer" relates to reasoning about or infer states of the system, environment, processes, levels within the hierarchical data structure, and/or a user from a set of observations captured via events and/or data. Inference can be employed to identify a specific context or action, or can generate a probability distribution of the states, for example. The inference can be probabilistic—that is, the computation of a probability distribution of the states of interest based on a consideration of data and events. Inference can also refer to techniques employed for composing higher level events from a set of events and/or data. Such inference results in the construction of new events or actions from a set of observed events and/or stored event data, whether or not the events are correlated in close temporal proximity, and whether the events and data come from one of several event and data sources. Various classification (explicitly and/or implicitly trained) schemes and/or systems (e.g., support vector machines, neural networks, expert systems, Bayesian belief networks, fuzzy logic, data fusion engines . . .) can be employed in connection with performing automatic and/or inferred action in connection with the claimed subject matter.

Voice commands received by the voice recognition component 302 (and possibly analyzed by the detection component 304) can be translated to a language that is interpretable by a processing device (e.g., the voice commands can be translated to queries formatted in a proper query language, such as SQL) and provided to a view generation component 306. The view generation component 306 can then access a data store 308 and retrieve data, images, and the like associated with the voice commands. As described above, the data store 308 can include sufficient data to generate an HMI given appropriate commands. The system 300 further includes a connection component 310 that facilitates generating a communications connection between a device which will be displaying an HMI 312 and devices controlled through such HMI 312. For instance, if the HMI 312 is built to control a press with three states, then a communications channel must be created between the HMI 312 and the press to facilitate control of the press. Thus, if an operator wished to transfer the press from a first state to a second state, such state alteration could be effectuated through the HMI 312.

Figure 4:
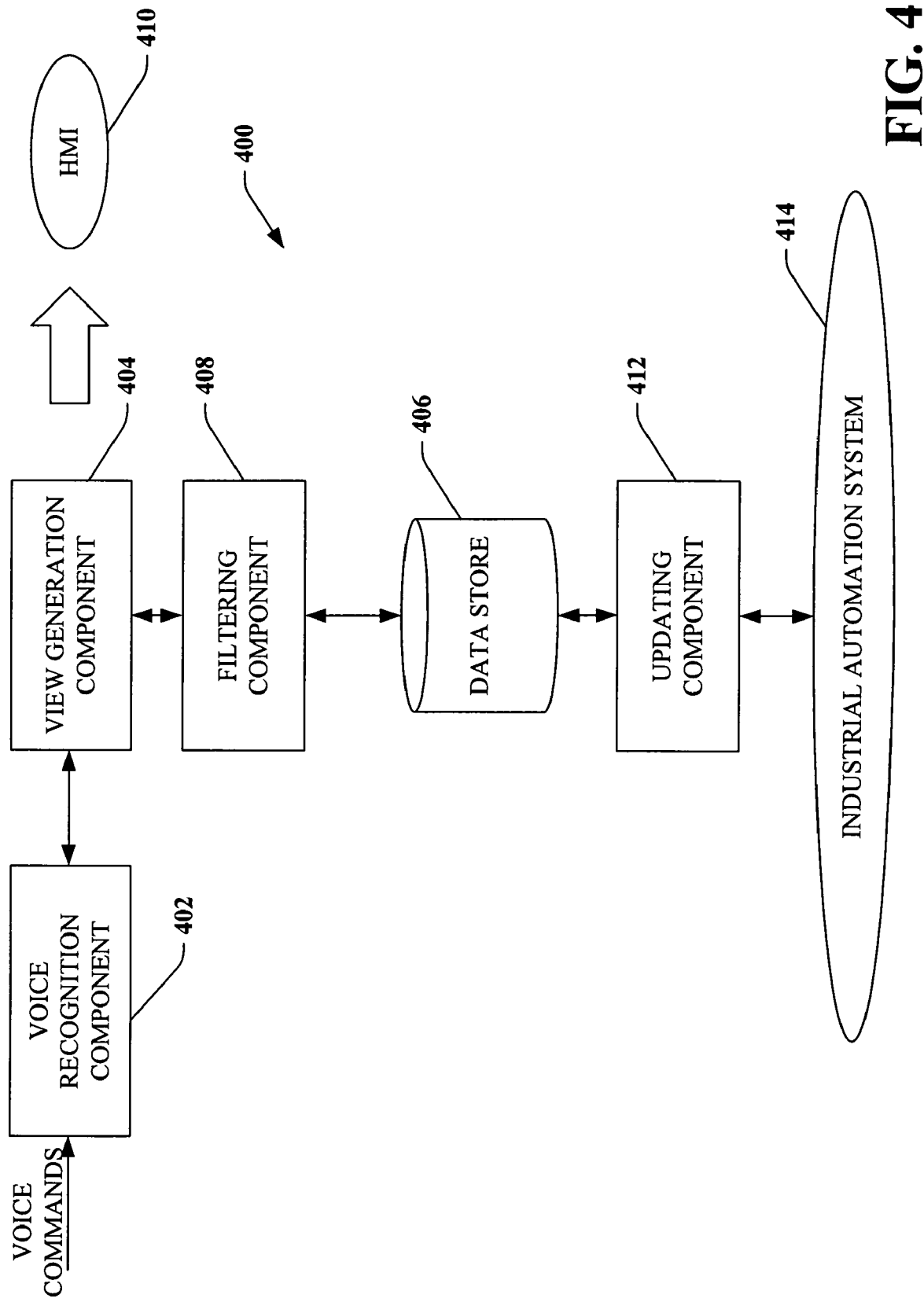
FIG. 4 is a system that facilitates updating a database that is employed in connection with generating a human-machine interface.

Referring now to FIG. 4, a system 400 that facilitates creation of HMIs via voice commands is illustrated. The system 400 includes a voice recognition component 402 that receives voice commands relating to a desirably generated HMI. The voice recognition component 402 can analyze and translate the received voice commands into a query or other suitable machine-readable statement. The view generation component 404 can then access a data store 406 by way of a filter 408. The data store 406 can include information sufficient to generate an HMI 410, including associations, device parameters, device capabilities, etc. However, certain data within such data store 408 may be filtered based upon operator identity, role, context, etc. For instance, an operator of a first process may be prohibited from generating an HMI relating to a second process. The filtering component 408 can further employ other contextual parameters, such as physical location of an individual desirably generating the HMI 410, time of generation, duration of use, or any other suitable parameter. This HMI 410 can then be provided to the operator for use in connection with controlling a system, device, process, and/or sub-process.

The system 400 further includes an updating component 412 that facilitates updating the data store 406 with data relating to an industrial automation system 414. For example, the updating component 412 can include plug-and-play functionality. Thus, when a device is added to a network, system, or process, the updating component 412 can receive data relating to such device, including capabilities of the device, associated devices, parameters relating to the device, physical location of the device, address of the device on a network, and any other suitable data. The updating component 412 can receive this information passively or actively. For instance, an added device can provide data to a network, which can then be received by the updating component 412. In another example, the updating component 412 can interrogate a device at a time of addition of the device to a network. Results of the interrogation can then be added to the data store 406.

To enable such addition of data and maintenance of a robust data store, data associated with the industrial automation system 414 can be structured in accordance with a hierarchically structured data model. For instance, the hierarchically structured data model can be based at least in part upon ISA S88, ISA S95, OMAC, and/or any suitable combination thereof. Accordingly, the data within the data store 406 can be representative of particular devices, portions of devices, processes, portions of processes, associations, and the like. Programmable logic controllers (not shown) utilized to control devices/processes can include at least a portion of a schema that enables such controllers to recognize and output data that is structured in accordance with the hierarchically structured data model. The programmable logic controllers, through utilization of this data model, can interact with other controllers as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller, thereby enabling seamless communication between programmable logic controllers and ERP systems. Conventional systems, in contrast, often require ad-hoc programming to map between low-level logic utilized in controllers with more advanced object-oriented programming languages often employed within ERP systems. Another common use would be to interact with a Supply Chain Management system (SCM).

The hierarchically structured data model can be designed in such a manner to enable the data received by the updating component 412 to correspond to a hierarchical arrangement of systems and/or a hierarchical arrangement of processes that occur within the plant. Furthermore, the hierarchically structured data model can be designed in a manner that enables modeling of a plant across system and/or process boundaries. The hierarchically structured data model can be implemented so that a substantially similar structure is provided with respect to a batch process, a continuous process, a discrete process, and inventory tracking.

Figure 5:
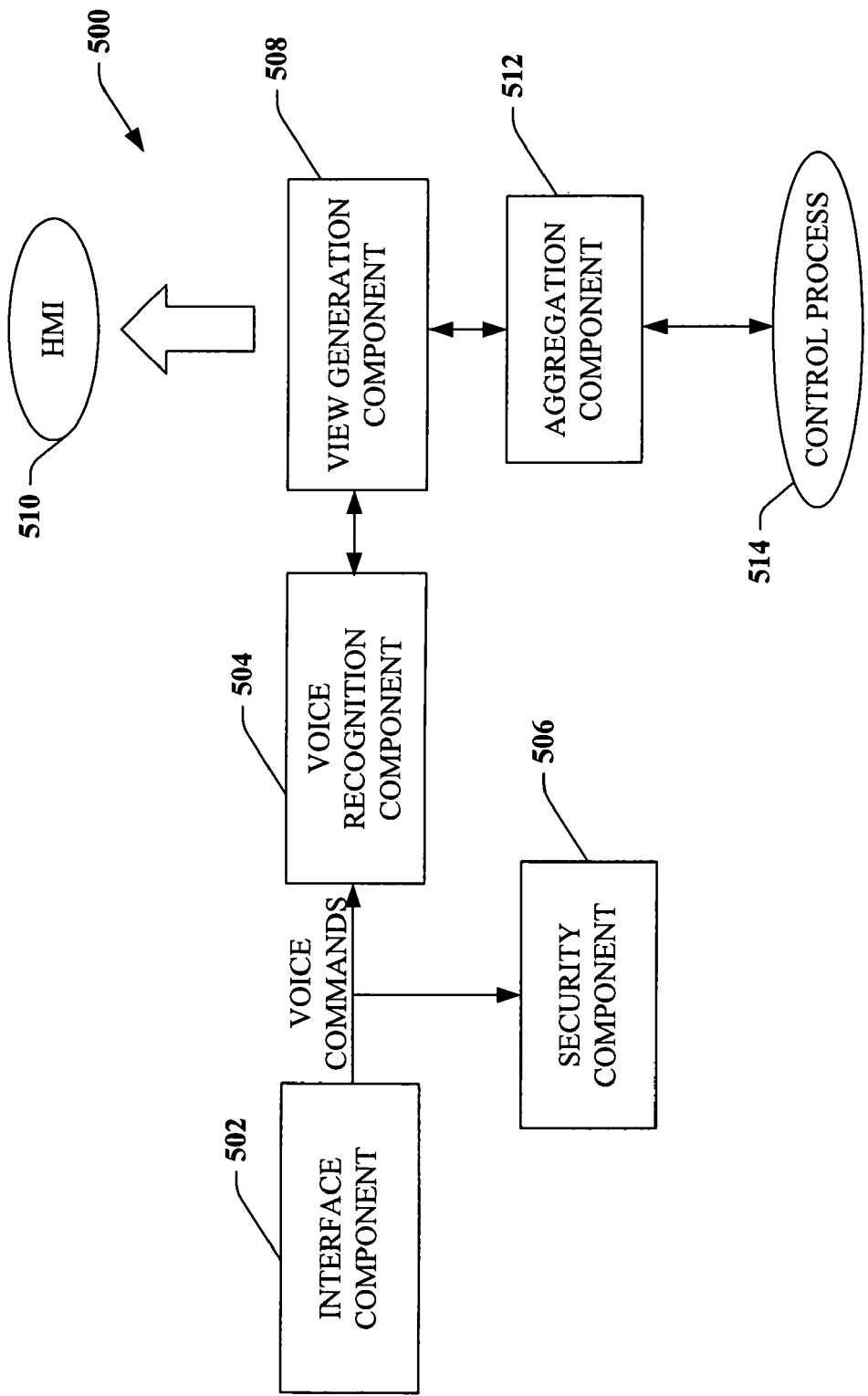
FIG. 5 is a system that facilitates aggregating data that is employed in connection with generating a human-machine interface.

Turning now to FIG. 5, a system 500 that facilitates generation of an HMI through voice commands is illustrated. The system 500 includes an interface component 502 that enables creation of an HMI via voice commands from any suitable location by way of the Internet or an intranet. For instance, as networks become more sophisticated and can transfer greater amounts of data at faster data rates, many operators can perform tasks (that at one time required physical proximity) from a remote location. For example, the interface component 502 can receive voice data from an operator relating to generation of an HMI. The voice commands can be received by a microphone associated with a computer and then relayed to a voice recognition component 504 and/or a security component 506. For instance, the security component 506 can analyze the voice commands and determine an identity of an individual providing such commands. The security component 506 can then determine authorizations associated with the provider of the voice commands. For instance, the provider of the voice commands may not be authorized to generate HMI for particular processes. Moreover, the security component 506 can request other identifying indicia, such as username, password, personal identification number (PIN), or any other suitable identifying indicia.

The voice recognition component 504 can analyze the voice commands and translate them into a computer-readable format (e.g., formatted as a query). The translated voice commands can be provided to a view generation component 508 that accesses data that can be employed to build an HMI 510. For example, the view generation component 508 can access/receive data indicating devices, systems, processes, sub-processes, capabilities of devices, and the like. In one exemplary embodiment depicted in FIG. 5, data is received by the view generation component 508 through an aggregation component 512 that is communicatively coupled to a control system and/or process 514. For example, rather than data being retained in a single data store, the aggregation component 512 enables utilization of a distributed database (not shown) in connection with generating the HMI 510. Furthermore, data can be received directly from industrial devices, such as programmable logic controllers. The aggregation component 512 can aggregate data associated with the control system/process 514 and provide such data to the view generation component 508. The view generation component 508 can thereafter create the HMI 510.

Figure 6:
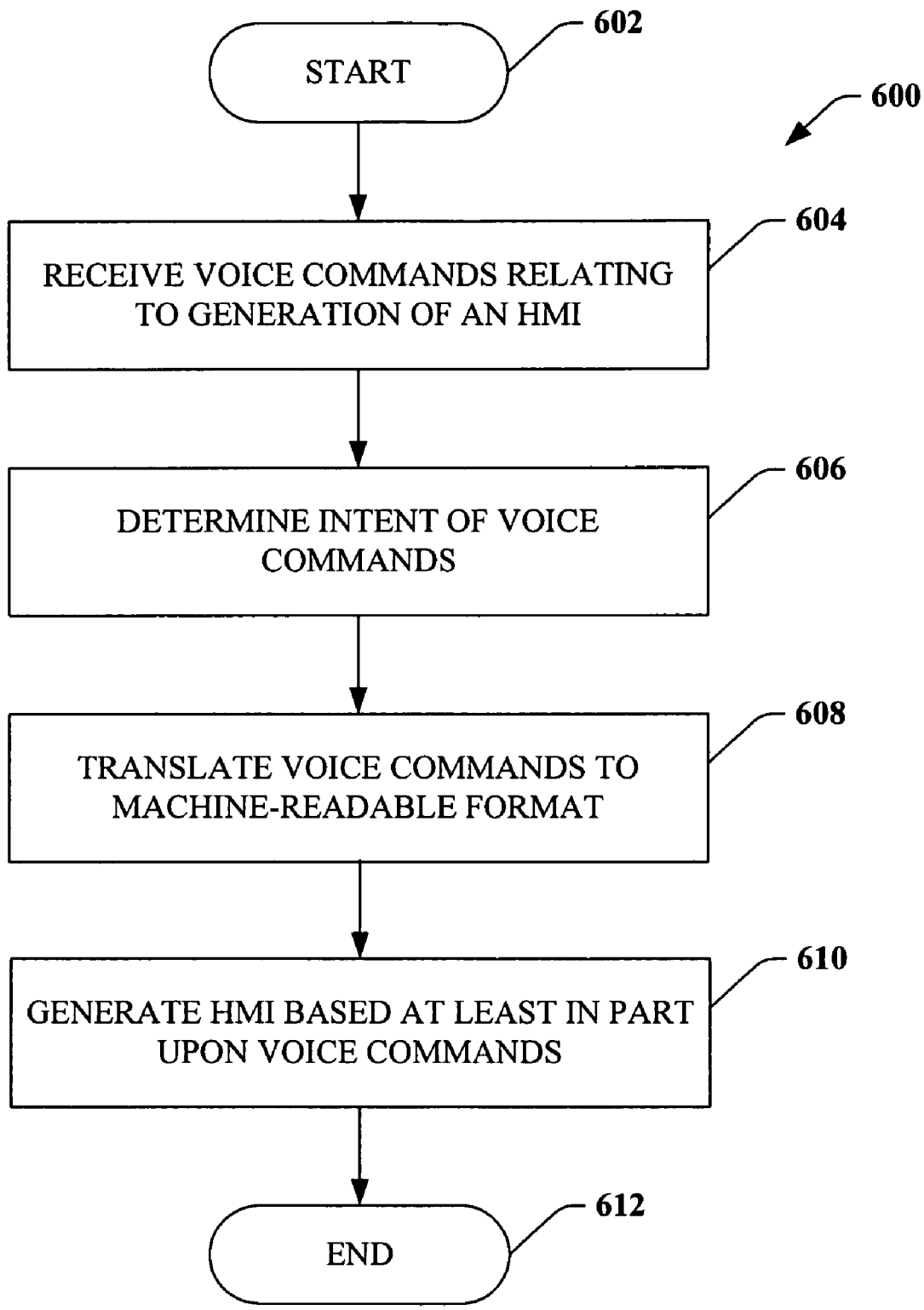
FIG. 6 illustrates a representative flow diagram of a methodology for building a human-machine interface based at least in part upon received voice commands.
Figure 7:
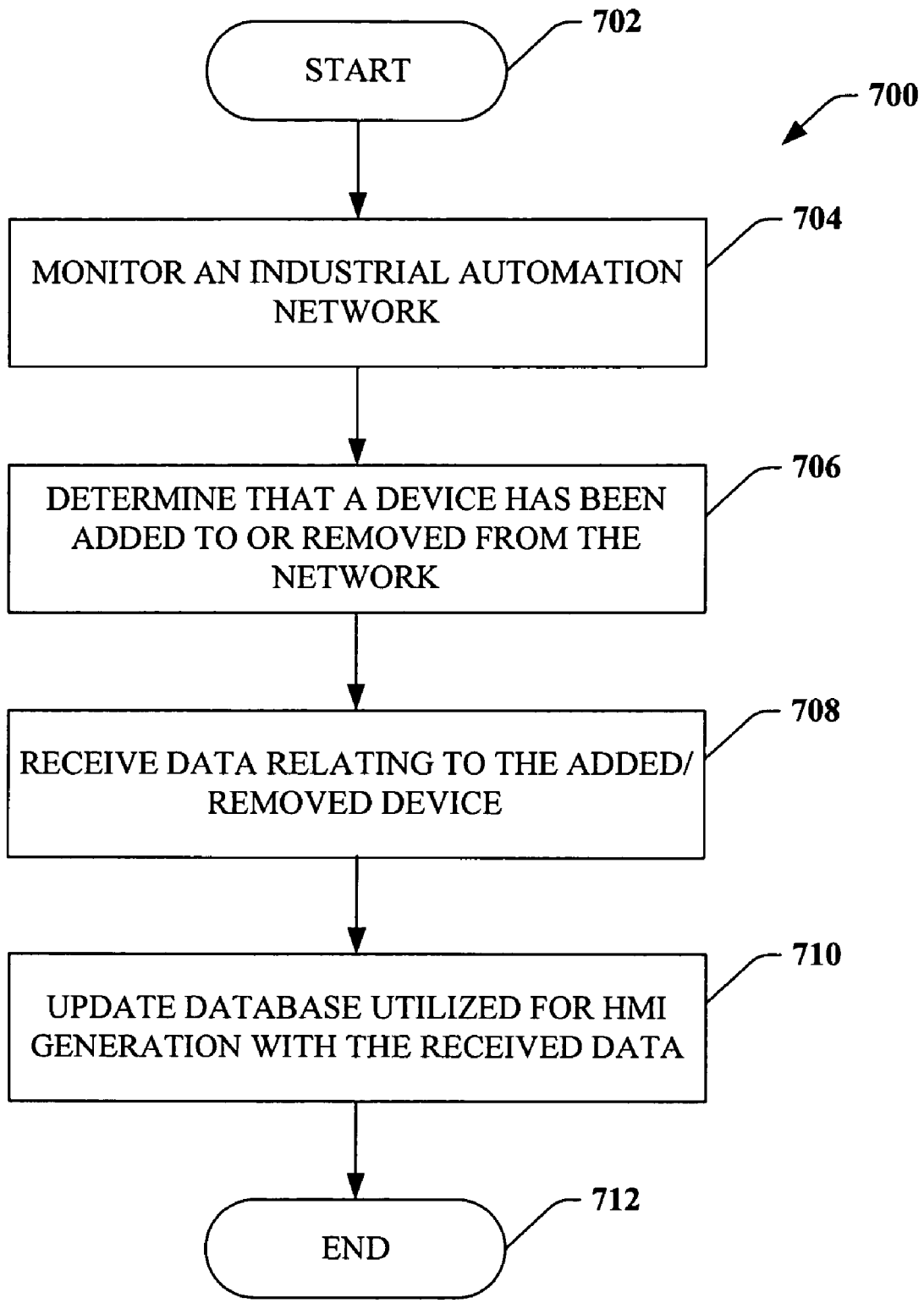
FIG. 7 is a representative flow diagram of a methodology for updating a database utilized in connection with creating human-machine interfaces.
Figure 8:
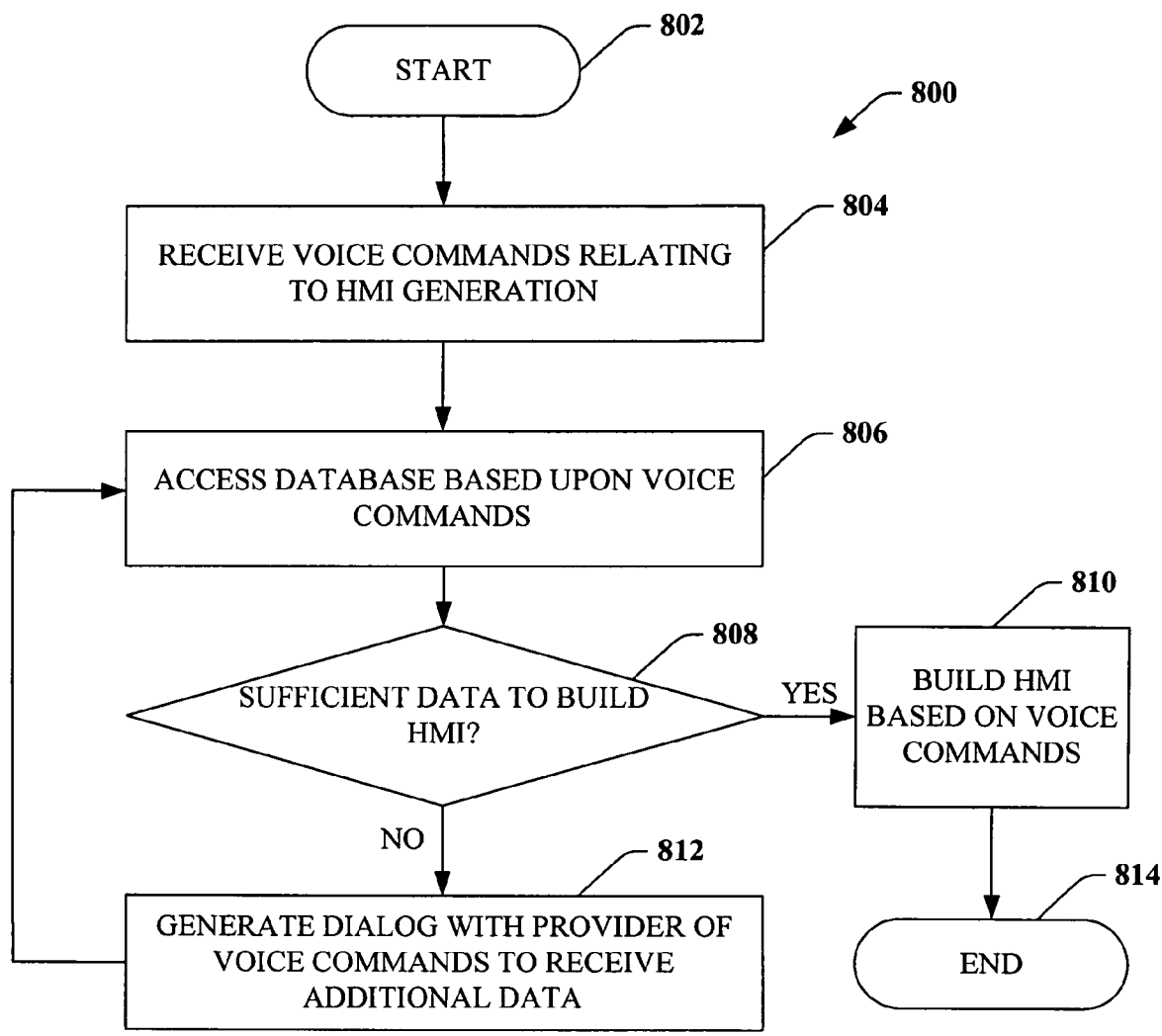
FIG. 8 is a representative flow diagram of a methodology for utilizing a dialog in connection with creating a human-machine interface.

Referring to FIGS. 6-8, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 6, a methodology 600 for automatically generating an HMI upon receipt of voice commands is illustrated. The methodology 600 starts at 602, and at 604 voice commands are received relating to generation of an HMI. For example, the voice commands can include information relating to system, device, process, and/or sub-process for which an HMI is desirably generated. At 606, the voice commands are analyzed to determine intent of such commands. For instance, the voice commands can be analyzed to determine which device or system to which the user is referring. At 608, the voice commands are translated into machine-readable format based at least in part upon the determined intent. For example, the voice commands can be converted to a query that is formatted in accordance with a database query language, wherein content of the query relates to information, graphics, and the like relating to the voice commands. At 610, an HMI is generated based at least in part upon the voice commands. For example, a database can be accessed, wherein the database includes at least graphical depictions of portions of a plant, video associated with a plant, device type, device associations (e.g., connected devices associated with the device), location of the device, access authorization for particular users, functionality of the device, type of user who can use an HMI associated with the device, role of the users, device authorizations, and the like. This data can be utilized to generate an HMI based at least in part upon the voice commands. The methodology 600 completes at 612.

Now referring to FIG. 7, a methodology 700 for updating a database utilized in connection with generation of HMI by way of voice commands is illustrated. The methodology 700 begins at 702, and at 704 an industrial automation network is monitored. For example, control commands are provided from a controller and/or operator over an industrial automation network, and such network can be monitored by any suitable computer component. At 706, it is determined that a device has been added to and/or removed from a network. For instance, a device added to the network can include sufficient intelligence to output data relating to such device to the network. In another example, the network can indicate that a device has been added to a particular port, and then the device can be interrogated to obtain data relating to the device. If a device is removed from a network, such removal can be located through the monitoring at 704. At 708, data is received relating to the added or removed device, and at 710 a database utilized for HMI generation is updated with such data. For instance, if the device is removed, data relating to that device can be deleted from the database. Furthermore, associations can be altered (e.g., data relating to devices connected to the removed device can be updated). If a device is added, data relating to such device can be added to the database. For instance, the added data can conform to a hierarchically structured data model. The methodology 700 completes at 712.

In another example, a database can be updated with video and/or picture data. For instance, a user can manually input this type of data into the database. In a different instance, cameras can be provided within an industrial environment and designed to send data directly to a data store. This would enable live video feed to be available within an HMI. For example, an HMI can be generated that points to a live video feed, and the display can be populated with data from such feed.

Turning now to FIG. 8, a methodology 800 for building an HMI based at least in part upon receipt of voice commands is illustrated. The methodology 800 begins at 802, and at 804 voice commands relating to HMI generation are received. As described above, the voice commands can indicate a system, device, process, and/or sub-process for which an HMI is to be created. At 806, a plant database is accessed to retrieve data in accordance with the voice commands, wherein the retrieved data is to be employed to create an HMI. At 808, a determination is made regarding whether the voice commands provided sufficient information to build an HMI. If such voice commands were associated with sufficient specificity, then at 810 an HMI is generated based at least in part upon the voice commands. If the voice commands were insufficient, then at 812 a dialog is created to solicit additional information from the user. The dialog can be presented as text or can be audibly output to the user. The methodology can then loop to 806, wherein the database can be accessed given additional voice commands. The methodology 800 can continue until the HMI can be generated at 810, and the methodology completes at 814.

Figure 9:
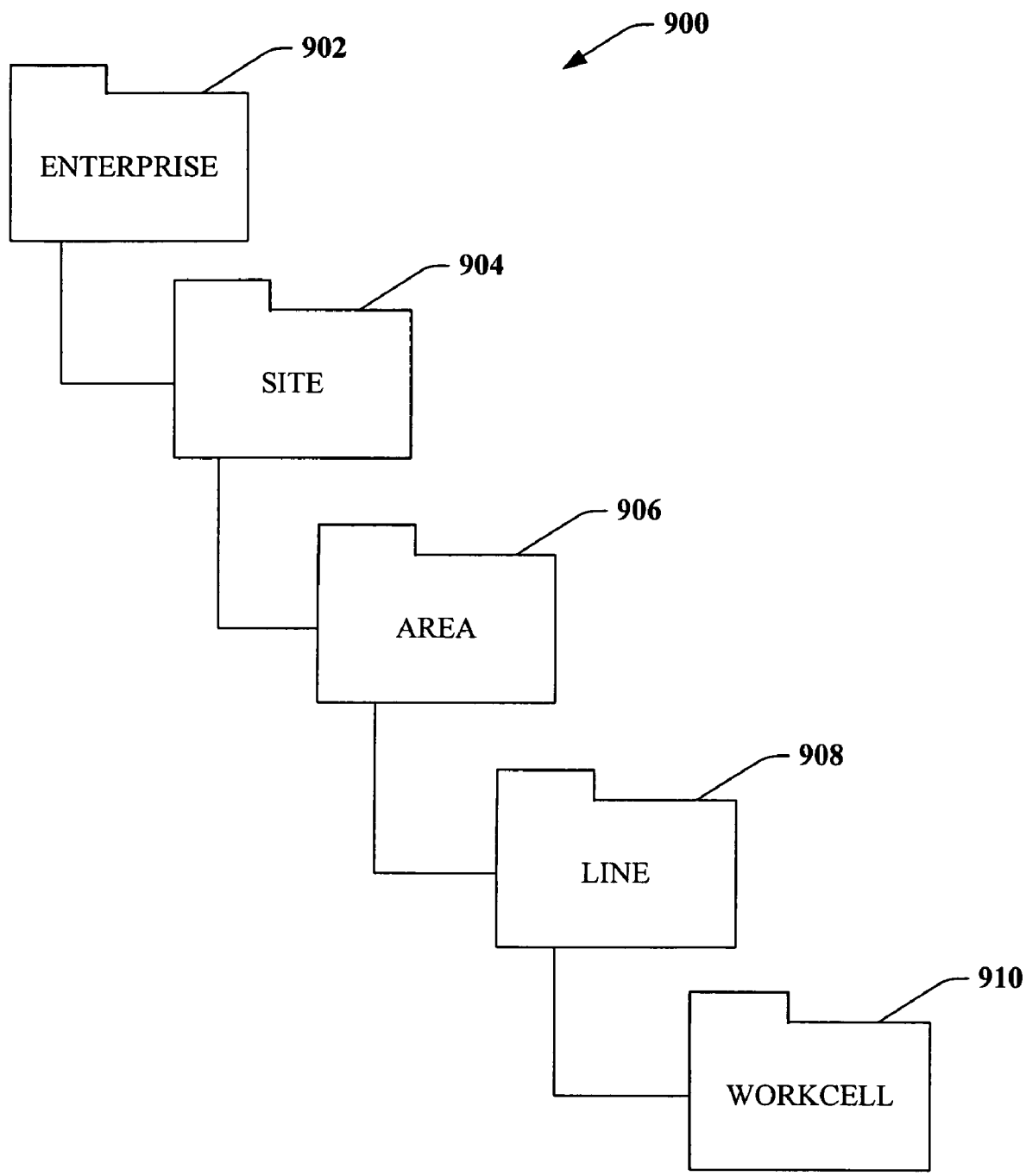
FIG. 9 is a visual representation of an exemplary structure upon which a hierarchically structured data model can be based.

Referring now to FIG. 9, an exemplary hierarchical structure 900 which can be utilized in connection with the hierarchically structured data model alluded to above is illustrated. For example, the data model can facilitate nested structures, thereby mitigating deficiencies associated with data models that employ flat namespaces. The structure 900 includes an enterprise level 902, where a particular enterprise can be represented within data structured in accordance with a hierarchical data model. Beneath the enterprise level 902 level can be a site level 904, so that a particular factory (site) within an enterprise can be represented within a data packet. Beneath the site level 904 an area level 906 can exist, which specifies an area within the factory that relates to the data. A line level 908 can lie beneath the area level 906, wherein the line level 908 is indicative of a line associated with particular data. Beneath the line level 908 a workcell level 910 can exist, thereby indicating a workcell associated with the data. Utilizing a nested, hierarchical data model, PLCs can become more aware of data associated therewith. Furthermore, the hierarchy 900 can be customized by an owner of such hierarchy. For instance, more granular objects/levels can be defined within the hierarchy 900.

Figure 10:
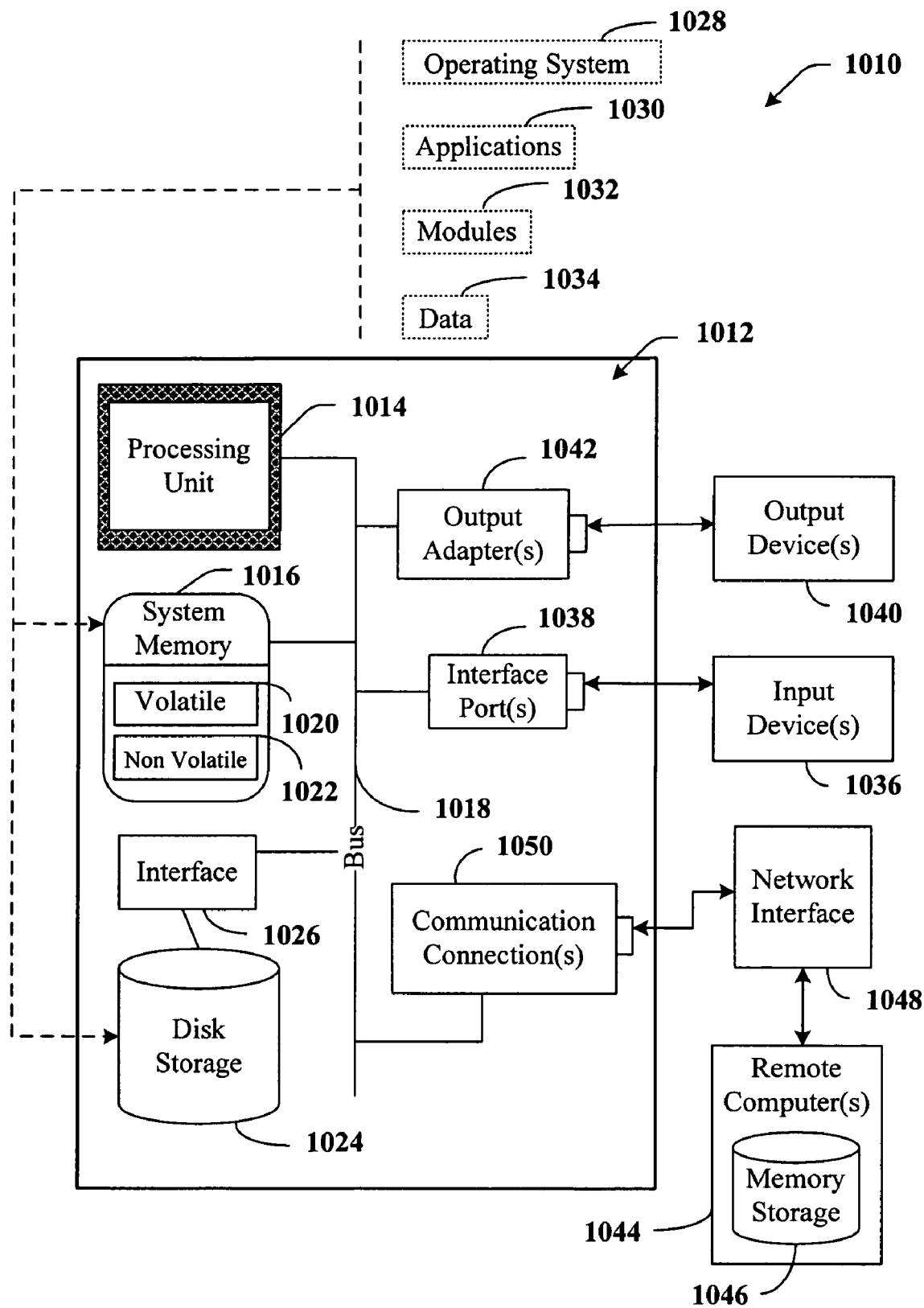
FIG. 10 is an example operating system upon which various features described herein can be implemented.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
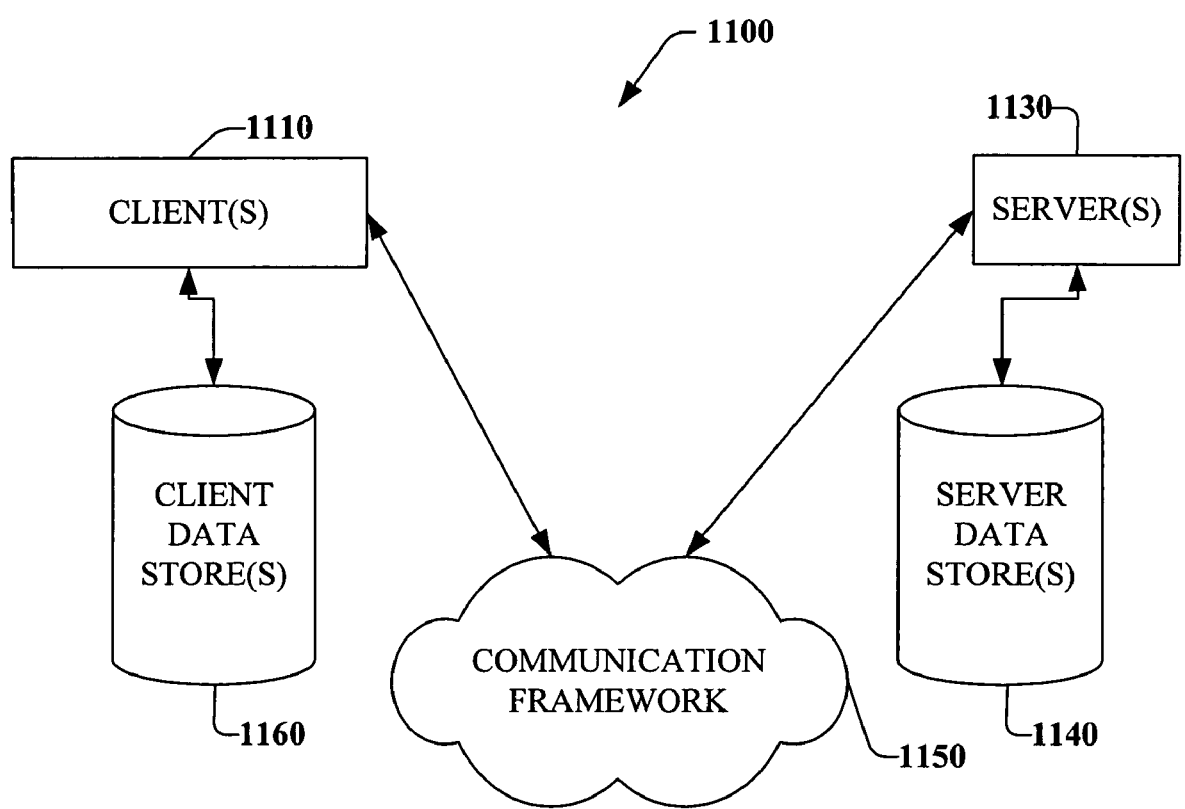
FIG. 11 is an exemplary computing environment within which various features described herein can interact.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented human-machine interface (HMI) generation system comprising:
    at least one processor coupled to a memory, the processor executes:
    a voice recognition component that receives voice commands relating to generation of a human-machine interface within an industrial automation environment, the voice recognition component further translates the voice commands into machine code;
    a view generation component communicatively coupled to the voice recognition component, the view generation component generates a human-machine interface based at least in part upon the received voice commands; and
    a data store accessed by the view generation component based upon the received voice commands to facilitate generating the human-machine interface, the data store retains data in accordance with a hierarchically structured data model (HSDM), the HSDM employs a common schema to represent devices, portions of devices, processes, portions of processes, associations between components, systems and applications at all levels of a plant wide system, the common schema allowing the low level logic language of a programmable logic controller (PLC) to interface with the high level language employed by a plant wide application allowing seamless communication between the PLC and the high level language application.

2. The system of claim 1, the view generation component accesses the data store that further includes graphical depictions of portions of the industrial automation environment that relate to the received voice commands.

3. The system of claim 1, further comprising an interactive component that requests additional information from an initiator of the voice commands, the requested information is based at least in part upon the received voice commands.

4. The system of claim 3, the interactive component requests user identity prior to the view generation component generating the human-machine interface.

5. The system of claim 4, the interactive component requests information relating to authorization of use of the human-machine interface and location of devices associated with the human-machine interface.

6. The system of claim 1, further comprising a user recognition component that recognizes a user based upon a dialect associated with the voice commands.

7. The system of claim 6, further comprising a classification component that aids in voice recognition upon recognition of identity of the user.

8. The system of claim 1, further comprising a detection component that recognizes synonyms and translates the synonyms to machine code.

9. The system of claim 1, further comprising a connection component that facilitates communicatively coupling a device that displays the human-machine interface with entities within the human-machine interface that are controlled through such interface.

10. The system of claim 1, the data store includes information relating to at least one of a device, system, process, and sub-process within the industrial automation environment.

11. The system of claim 10, the data store includes at least one of a graphical depiction of the device, a photographic image of the device, and video relating to the device.

12. The system of claim 10, the data store includes at least one of devices associated with a device and capabilities of the device.

13. The system of claim 10, further comprising an updating component that automatically updates devices and their associated content in the data store based upon detecting the addition or removal of a device from a network, process or system.

14. The system of claim 10, further comprising a filtering component that filters data within the data store based at least in part upon user identity, user role, and user location.

15. The system of claim 10, further comprising an interface component that facilitates generation and implementation of the human-machine interface from a remote location.

16. The system of claim 10, further comprising a security component that ensures that an individual providing the voice commands is authorized to generate the human-machine interface.

17. The system of claim 10, further comprising an aggregation component that aggregates data associated with a distributed database.

18. The system of claim 1, the high level language application is at least one of an Enterprise Resource Planning (ERP) system or a Supply Chain Management (SCM) system.

19. A computer-implemented method for generating human-machine interfaces comprising:
  receiving voice commands, at a voice recognition component, relating to at least one of a device, a system, a process, and a sub-process for which a human-machine interface is desirable generated;
  analyzing the voice commands on a processor to determine intent of a provider of the voice commands;
  accessing a data store based at least in part upon the voice commands, the data store retaining data in a memory in accordance with a hierarchically structured data model schema, the schema represent devices, portions of devices, processes, portions of processes, associations between components, systems and applications at all levels of a plant wide system, the common schema allowing the low level logic language of a programmable logic controller (PLC) to interface with the high level language employed by a plant wide application allowing seamless communication between the PLC and the high level language application, the schema can be applied to at least one of a batch process, a continuous process, a discrete process, or inventory tracking;
  retrieving data from the data store to be utilized by a processor for constructing the human-machine interface or a portion thereof; and
  generating by processor at least a portion of the human-machine interface, for display via a display device, based at least in part upon the analysis of the voice commands, the data retrieved from the data store, or a combination thereof.

20. The methodology of claim 19, further comprising creating a connection to facilitate controlling the at least one of the device, the system, the process, and the sub-process by way of the human-machine interface.

21. The methodology of claim 19, further comprising requesting additional information based at least in part upon the received voice commands.

22. The methodology of claim 19, further comprising generating portions within the human-machine interface that result in a tool-tip being displayed upon a mouse hovered over the portions.

23. The methodology of claim 19, further comprising:
  requesting identity of the provider of the voice commands; and
  verifying identity through at least one of voice recognition, username, password, and personal identification number.

24. The methodology of claim 19, further comprising automatically populating a data store with data utilized in connection with generating the human-machine interface.

25. An HMI generation system, comprising:
  means for receiving and analyzing voice commands by a processor relating to generating an HMI in an industrial automation environment;
  means for accessing a plant database to retrieve data utilized for generation of the HMI, accessing a data store based at least in part upon the voice commands, the data store retains data in a memory in accordance with a hierarchically structured data model schema, the schema represent devices, portions of devices, processes, portions of processes, associations between components, systems and applications at all levels of a plant wide system allowing the low level logic language of a programmable logic controller (PLC) to interface with the high level language employed by a plant wide application allowing seamless communication between the PLC and the high level language application; and
  means for generating by a processor the HMI based at least in part upon the received voice commands.

26. The HMI generation system of claim 25, further comprising means for updating the database.

27. The system of claim 25, further comprising means for accessing user authorizations with respect to a device and implementing such authorizations within the generated HMI.

* * * * *

UNITED STATES PATENT AND TRADEMARK OFFICE
CERTIFICATE OF CORRECTION

PATENT NO. : 7,590,541 B2
APPLICATION NO. : 11/240131
DATED : September 15, 2009
INVENTOR(S) : Virji et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Twenty-first Day of September, 2010

David J. Kappos
*Director of the United States Patent and Trademark Office*